Patented Dec. 6, 1938

2,139,002

UNITED STATES PATENT OFFICE 2,139,002

PRODUCTION OF LITHARGE FROM LEAD AND SODIUM NITRATE

Robert M. Cole, Bryn Athyn, Pa.

No Drawing. Application May 23, 1936, Serial No. 81,508

4 Claims. (Cl. 23—146)

This invention relates to the production of litharge from lead and sodium nitrate and it has for its primary object the provision of a process which is simple, economical and susceptible of operation on commercial scale.

The following example will illustrate how the invention is practiced. A thousand pounds of sodium nitrate are fused and into the fusion, molten lead is gradually fed as by spraying. The temperature is maintained at about 415° C. until about 2800 pounds of lead are added. This requires about five hours. During this period, the mixture is vigorously stirred.

The vessel used is a jacketed, trunnioned pot in which the sodium nitrate is fused or may be introduced in a fused condition. Since the reaction is violently exothermic the process must be delicately and accurately controlled and one way of doing this is by introducing a cooling fluid, as for example, by blowing air into the jacket and by the use of thermostats, cooler or warmer air being employed as required. After the reaction has proceeded to a certain extent, the temperature tends to lower and, say at about two and one-half hours, it may be necessary to begin adding some heat, the amount of heat being added gradually increasing until the end of the five hour period. This is done by substituting hot fluid, such as hot gas, for the cooling fluid in the jacket. After the five hour period, the ingredients are allowed to react for an additional hour also with continuous stirring to get more complete conversion. No heat need be applied other than to maintain the desired temperature.

The mixture is then poured into the pan to cool for subsequent leaching or directly into water to leach out unreacted nitrate.

This process employs about twelve per cent excess lead and the yield is about ninety-six per cent of the theoretical.

What I claim is:
1. The process of producing litharge from lead and sodium nitrate which includes heating a batch of sodium nitrate in a vessel to substantially 415° C., then slowly adding molten lead to the fusion of sodium nitrate, agitating the fusion during addition of the lead and maintaining the temperature during the addition at substantially 415° C.

2. The process of producing litharge from lead and sodium nitrate which includes heating a batch of sodium nitrate in a vessel to substantially 415° C., then slowly adding a batch of molten lead to the fusion of sodium nitrate, agitating the fusion during addition of the lead, cooling the mixture during said initial portion of the treatment to maintain the temperature at substantially 415° C., and in later stages of the process heating the mixture to maintain the temperature at substantially 415° C.

3. The process of producing litharge from lead and sodium nitrate which includes heating a batch of sodium nitrate in a vessel to substantially 415° C., then slowly adding a batch of molten lead to the fusion of sodium nitrate, agitating the fusion during addition of the lead, the amount of lead added being approximately 12% in excess of the theoretical, and maintaining the temperature during the addition of lead at substantially 415° C.

4. The process of producing litharge from lead and sodium nitrate which includes heating a batch of sodium nitrate in a vessel to substantially 415° C., then slowly adding molten lead to the fusion of sodium nitrate by spraying the lead thereon, agitating the fusion during addition of the lead, and maintaining the temperature during the addition of the lead at substantially 415° C.

ROBERT M. COLE.